Jan. 31, 1933.                    J. H. FEDELER                    1,895,618
                                 AIR FILTER DEVICE
                     Filed Oct. 12, 1927           2 Sheets-Sheet 1
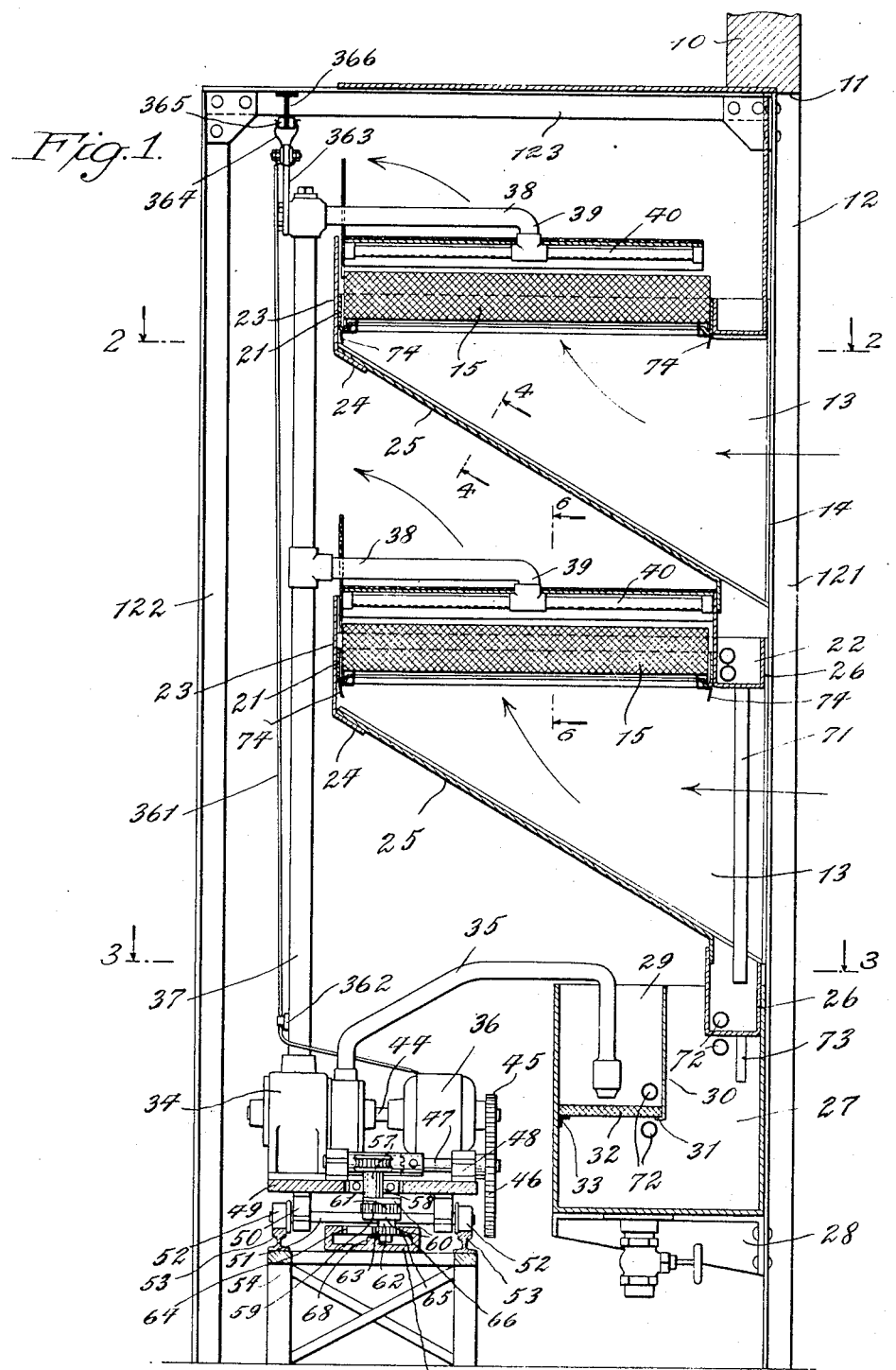
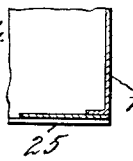
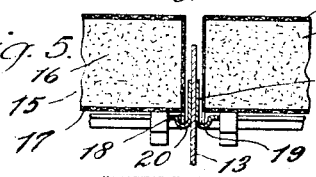
INVENTOR.
John H. Fedeler
BY
Gifford & Henn
ATTORNEYS.

Jan. 31, 1933.  J. H. FEDELER  1,895,618
AIR FILTER DEVICE
Filed Oct. 12, 1927  2 Sheets-Sheet 2
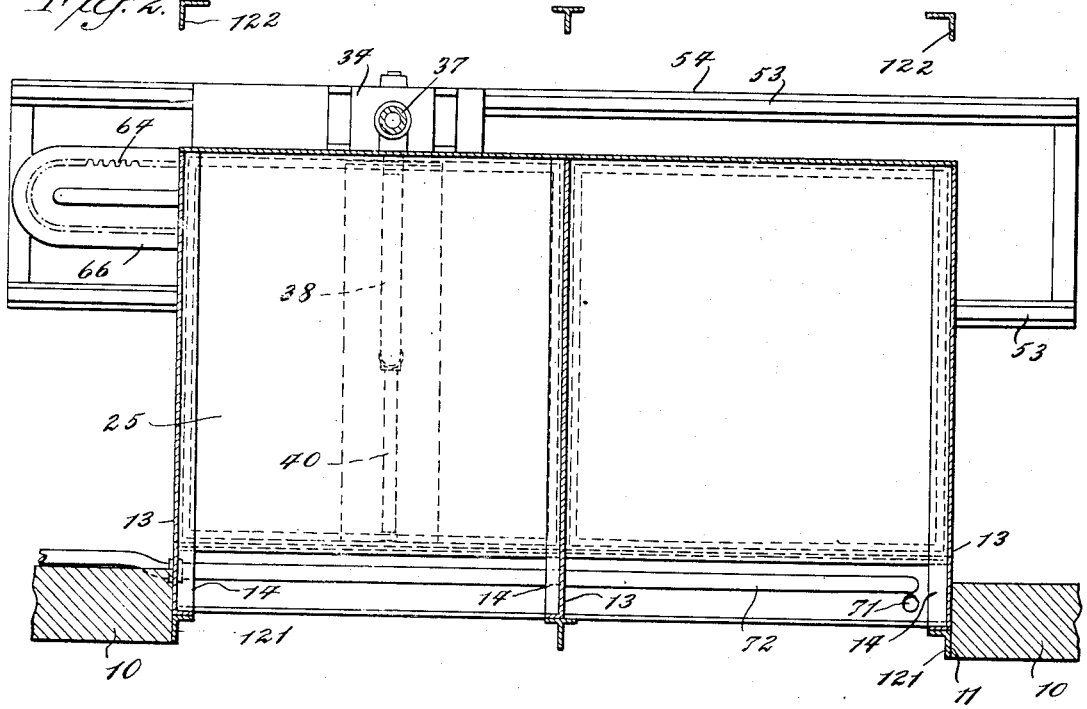
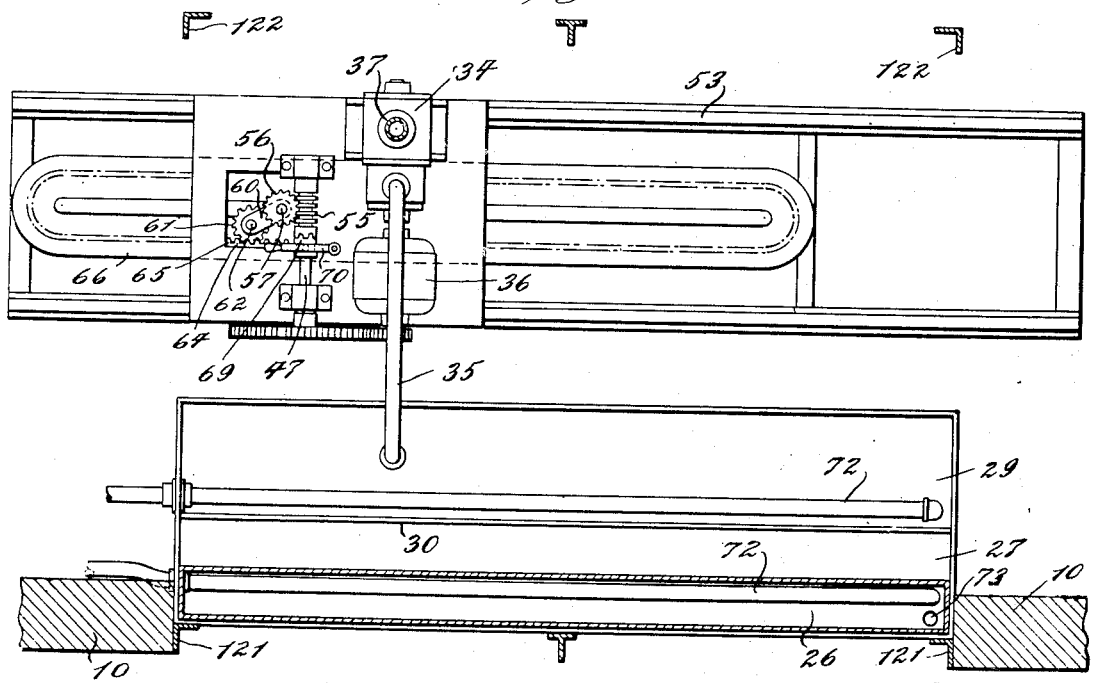
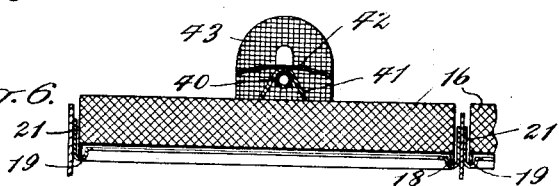

Patented Jan. 31, 1933

1,895,618

UNITED STATES PATENT OFFICE

JOHN H. FEDELER, OF NEW YORK, N. Y., ASSIGNOR TO AMERICAN AIR FILTER COMPANY, INC., OF LOUISVILLE, KENTUCKY, A CORPORATION OF DELAWARE

AIR FILTER DEVICE

Application filed October 12, 1927. Serial No. 225,659.

My invention more particularly relates to an air filter system in which means are provided for cleaning the filter.

My invention will best be understood by reference to the accompanying drawings, in which Fig. 1 is a vertical sectional view through a filter device embodying my invention; Fig. 2 is a sectional plan view taken on the line 2—2 of Fig. 1; Fig. 3 is a sectional plan view taken on the line 3—3 of Fig. 1; Fig. 4 is a fragmentary section taken on the line 4—4 of Fig. 1; Fig. 5 is a fragmentary sectional view illustrating a portion of the filter frame and filter mounted thereon, together with a means for securing the filter to the frame, and Fig. 6 is a sectional view taken on the line 6—6 of Fig. 1.

Like reference characters indicate like parts throughout the drawings.

Referring now to the drawings in which I have illustrated one embodiment of my invention, 10 is a wall provided with an opening 11 in which is set the front of the filtering device embodying my invention. In the embodiment illustrated, the device is mounted in a frame 12 comprising front and rear angle irons 121 and 122 secured at their upper ends to a horizontal angle iron 123. The lower ends of the angle irons 121 and 122 are secured to the floor in any desired manner.

In accordance with my invention, the filters are preferably arranged at an angle to the vertical, and in the embodiment illustrated, they are horizontal. The frame for the filters comprises gusset plates 13 which are preferably substantially triangular in form as illustrated in Fig. 1, and vertically disposed, the front, broader end of said plate preferably being provided with a flange 14 secured to one of the flanges of the front supporting members 121 of the frame.

In the embodiment of my invention illustrated, I have shown two filters 15 arranged one above the other. The filters are arranged at an angle to the vertical, and are here illustrated as extending horizontally, although it will be understood that they may be inclined and still come within my invention. It will, of course, be understood that any desired number may be used, and as the construction of each of the filters and the supporting frames therefor are or may be the same, the description of one will suffice for all.

The filter, in the embodiment illustrated, comprises a filter proper 16, consisting of any desired filtering material or baffle plates enclosed in a casing 17 (see Fig. 5) which may be of metal or other material, perforated on the upper and lower sides, but imperforate at the sides and ends. The filter proper 16 and the casing 17 in which it is enclosed thus constitute the filter 15. The edges of the casing 17 are preferably extended downwardly at the bottom as at 18, these extensions being received in a dished portion 19 of an auxiliary frame 20 provided with flanges 21 which are secured at one end to the gusset plates 13, as best shown in Fig. 5, and at one side to a trough or gutter 22 which will be hereinafter more fully described, and on the other side to a tie plate 23 (Fig. 1) extending across the entire filter device and secured to the gusset plate as by angles formed at the ends thereof. The bottom of the plate 23 is preferably bent as at 24, and is secured to an inclined plate 25 one end of which is preferably located near the filter in any desired manner as by welding, riveting or beading, the plate 25 being secured to the gusset plate and to the upper side of the bent portion 24.

The lower side of the filter 15 is exposed to the air, and it will be understood that air is forced through the filter by a fan or blower (not shown). By inclining the plate 25 located below the filter, the direction of the entering air prior to its passage through the filter is changed, and such change in direction causes a considerable portion of the dust and other foreign matter carried by the air to be deposited upon the plate. Furthermore, by causing the end of the plate 25 to rest upon the lower bent portion 24 of the plate 23, it forms a sealed joint against passage of air between the two plates. The lower inclined ends of the plate 25 lead to the troughs 26 preferably secured to the framework (see Fig. 3). The lower ends of the inclined plates 25 are preferably bent as illustrated, and are received on the inner sides of the troughs 26, being preferably secured thereto in any desired manner, so that the washing medium which is passed through the filters in the manner to be presently described, flows along the plates 25 and into the troughs 26.

In accordance with my invention, means are provided for causing a cleaning fluid to pass through the filters from the upper sides to the lower sides thereof. In the embodiment of my invention illustrated, a suitable cleaning fluid, such as water or oil, is contained in a tank 27 which may be supported as by a flanged member 28 secured to the frame 12 as illustrated in Fig. 1. It will be understood that the tank 27 extends across the entire filtering device and is for the purpose of collecting and containing a supply of the oil, water, or other medium with which the filters are cleaned.

In accordance with my invention, an auxiliary tank 29 is located in the tank 27, the same being formed in part by a vertical plate 30 extending longitudinally of the tank, the lower end of said plate preferably being bent as at 31. The same end walls for the tank 27 serve as end walls for the auxiliary tank 29. The bottom of said auxiliary tank is closed by a suitable filter 32 seated on the bent edge 31 of the plate 30 and on an angle iron 33 secured to a wall of the tank 27. The dust and other solid matter carried by the air, and which is filtered therefrom by the filters and washed downwardly by the cleaning material, is carried by the cleaning material when it is received in the tank 27 and there settles at the bottom thereof. Any material, however, that does not settle in the cleaning fluid as it passes into the auxiliary tank 29, is filtered from the cleaning fluid which rises in the auxiliary tank to the level in the tank 27.

The cleaning fluid is drawn from the auxiliary tank 29 and passed through the filters by mechanism which will now be described. Preferably, the cleaning material is drawn from the auxiliary tank 29 by a pump 34 which is preferably located below the level of the liquid in the auxiliary tank 29. The pump is connected to the tank by a bent pipe 35, and may be operated by any suitable device such as an electric motor 36. The cleaning fluid is forced by the pump 34 through a pipe or pipes 37 extending upwardly back of the tier of filters 15. Suitable lateral pipes 38 are connected to the stand pipe 37, and at their free ends are bent downwardly as at 39 and communicate with delivery pipes 40 provided with perforations or slits along the lower sides thereof, so that the cleaning material which is forced upwardly from the pump is delivered through the nozzles 40 above the filter media.

Means, preferably in the form of suitable shields, are located above the filters for preventing any cleaning material from being carried upwardly by the force of the air passing through the filters. Preferably, a bent shield 41 is located over and supported on the delivery pipe 40 as best shown in Fig. 6, the bent edges of this shield extending downwardly approximately to the surface of the filter 15. The shield 41 may be formed of felt or other suitable material and serves to prevent the air passing through the filter from carrying the cleaning liquid that is being delivered from the nozzle upwardly. Preferably, a second shield 42, which may be shaped as illustrated in Fig. 6, is located above the shield 41 and preferably extends laterally beyond the edges of the shield 41 and prevents air, which is moving upwardly through the filter, from carrying cleaning fluid which may be on the filter adjacent the edges of the shield 41 upwardly. A third vertically extending shield 43 surrounds the pipe 38 and may be secured thereto. The shields 42 and 43 may be formed of wire gauze or other suitable material.

Preferably, means are provided for causing the delivery pipes 40 to move back and forth above the filters while the cleaning operation is being carried out. In the embodiment of my invention illustrated, on the shaft 44 of the motor 36 is mounted a pinion 45 meshing with a gear wheel 46 which is, in turn, mounted on a shaft 47 having its bearings in suitable standards 48 mounted on a base plate 49 supported on axle bearings 50 which are, in turn, mounted on axles 51. Suitable wheels 52 are mounted on the ends of the axles 51 and are adapted to move along rails 53 mounted on a frame 54. The shaft 47 is provided with a worm 55 meshing with a worm wheel 56 on a vertical shaft 57 illustrated in dotted lines in Fig. 1, which is received in a bearing member 58 mounted on the base plate 49. On the lower end of the shaft 57 is mounted a pinion 59. Above and below the pinion 59 on the shaft 57 are mounted two laterally extending arms 60 as best shown in Figs. 1 and 3. Between the free ends of the arm 60 is mounted a pinion 61 on a shaft 62 extending through the two arms, and on the lower end of said shaft is mounted a pinion 63 adapted to mesh with the teeth 64 on a rack 65. The teeth 64 are preferably formed on the inner edge of an annular continuous flange 66 on a rack member 67 secured on the frame 54. It will be noted that the teeth are continued at the end of the member 67, thereby forming a continuous and more or less elliptical rack.

The pinion 63 is held against the rack by an intermediate upwardly extending rib 68 on the member 67 and which engages the lower end of the shaft 62. When the pinion 63 reaches the end of the rack member 67, the pinion, in following the rack, rides around the end of the intermediate rib 68 and engages the teeth on the opposite side of the rack member 67, and the movement of the carriage is thereby reversed.

In the embodiment of my invention illustrated, current is conducted to the electric motor 36 by a conductor 361 preferably suitably attached to the pipe 37 as at 362 and 363, the upper end of the conductor being provided with a trolley or shoe 364 engaging a conductor or conductors 365 preferably mounted on an insulated member 366.

A clutch member 69 (see Fig. 3) is preferably mounted on the shaft 47, and is operable, when desired, by a lever 70 to disconnect the worm 55 and the gearing which moves the carriage back and forth.

During the normal operation of the device, the carriage with the associated parts is moved back and forth on the rails 53, and the delivery pipes 40 are moved back and forth above the filters 15 delivering cleaning fluid above the same. At the same time, the pipe 35 moves back and forth in the auxiliary tank 29 and without the necessity of using a hosing which in practice would be worn or torn.

The cleaning fluid delivered above the filters passes through the latter and is conducted by the inclined plates 25 to the troughs 26, each of the troughs, with the exception of the lowermost one, communicating with the next lower trough by one or more pipes or conduits 71. Each of the troughs is preferably provided with a heating device 72 which is here illustrated as steam pipes. The heating devices are desirable to prevent the cleaning material, such as oil or water, from congealing and interfering with the circulation of the cleaning material. To the lowermost trough 26 is preferably connected a pipe 73 leading to the main tank 27. Heating devices 72 are also preferably located in the main tank 27 and in the auxiliary tank 29 to insure the cleaning fluid being kept in a mobile condition.

In operation, oil is caught in the dished portions 19 of the inner frame to form an air seal and thereby prevent escape of air from the device.

Each filter is preferably fastened down by suitable means, here illustrated as hook members 74, two of which are illustrated in Fig. 1, and any number of which, of course may be used. These hook members, when the filter is inserted in position in the filter device, snap beneath the frame 19 and prevent the filter from being lifted from its position by the force of the air pressure.

The operation of the device embodying my invention will readily be understood from the foregoing description and is as follows:

Air is drawn through the filters from the underside to the upper side by fans or blowers (not illustrated), the air before it enters a filtering device being deflected upwardly by the inclined plates 25, causing dust and other foreign matter carried thereby to be deposited upon the inclined plates. Any foreign matter that is not deposited upon the plates 25 is removed from the air by the filters, mostly on the lower sides thereof. At the same time, the cleaning material, such as oil or water, is drawn from the main tank 27 by the pump 34 through the pipe 35, the end of the pipe being carried from one end of the tank to the other as the carriage on which the pump is mounted is carried from one end of the rack to the other during the normal operation. At the same time, the stand pipe or pipes 37, together with the delivery pipes 40 which are connected thereto and communicate therewith, travel back and forth above the filters and deliver the cleaning fluid to the upper sides thereof. The cleaning fluid then flows through the filters and washes therefrom any dust or other foreign matter which has collected thereon, and such foreign matter which is washed from the filters is carried by the cleaning material to the inclined plates 25 and directed downwardly to the troughs 26 from which it is carried successively to the main tank 27 in which a large part of such foreign matter settles as sediment in the bottom of the tank. Any foreign matter in the cleaning fluid which does not settle in the auxiliary tank 29, is removed by the filter 32 as the cleaning fluid flows upwardly from the main tank 27 into the auxiliary tank 29.

In accordance with my invention, an automatic filter is provided in which the cleaning of the filters is carried out without the aid of mechanical labor, and in which no flexible hose is dragged back and forth and which would be objectionable for various reasons.

A further advantage of my invention is that a simple unitary construction is provided which is suitable for large and small filter plants.

With air filters of the prior art, dust and other foreign matter carried by the air is deposited on the filter as the air passes therethrough, and the filters become clogged unless they are periodically cleaned. In practice, the cleaning of air filters is neglected, or, if they are cleaned under competent supervision, the process is expensive.

In accordance with my invention, an automatic filter is provided which keeps the filters clean without the attention on the part of the operator.

I claim:

1. In a filter device, a filter, means for conducting air through said filter, a tank adapted to contain cleaning fluid, a filter member located in the bottom of said tank, means for passing the cleaning fluid upwardly through said filter member into said tank, and for conducting the cleaning fluid from said tank to the filter.

2. In a filter device, a filter, means for passing air therethrough, a movable carriage, a pump mounted on said carriage, means for delivering a cleaning fluid from the pump to the filter, a motor mounted on said carriage, and means operable by said motor for reciprocating said carriage.

3. In a filter device, a filter provided with a flange extending downwardly around the edge thereof, a frame provided with a dished portion in which said flange is received, and means for passing a cleaning fluid downwardly through said filter some of which is received in said dished portion, whereby an air seal is formed between said flange and said dished portion of the frame.

JOHN H. FEDELER.